United States Patent [19]

Rawlings et al.

[11] Patent Number: 4,517,138

[45] Date of Patent: May 14, 1985

[54] DEVICE AND METHOD FOR CENTRIFUGALLY CASTING ARTICLES

[75] Inventors: David L. Rawlings, Bayville; Robert E. Glick, Huntington Station, both of N.Y.

[73] Assignee: International Hydron Corporation, New York, N.Y.

[21] Appl. No.: 490,634

[22] Filed: May 2, 1983

[51] Int. Cl.³ .............................................. B29D 11/00
[52] U.S. Cl. ........................................ 264/2.1; 65/302; 264/1.1; 264/297.8; 264/311; 425/434; 425/808
[58] Field of Search ............... 264/310, 311, 2.1, 1.1, 264/297; 65/71, 302; 425/808, 21, 434; 432/125

[56] References Cited

U.S. PATENT DOCUMENTS 3,107,141 10/1963 Crafton .
3,660,545 5/1972 Wichterle .............................. 264/1.4
3,790,336 2/1974 Brede .................................. 432/125

FOREIGN PATENT DOCUMENTS 159359 4/1974 Czechoslovakia .

*Primary Examiner*—Jay H. Woo
*Assistant Examiner*—Mike McGurk
*Attorney, Agent, or Firm*—Vincent P. Pirri

[57] ABSTRACT

A device and method for spin casting articles such as lenses employing a polymerization tube in conjunction with a plurality of molds such that the tube is adapted to accommodate the plurality of molds in an interference fitting and sliding relationship so that rotation of the polymerization tube will cause the molds to rotate at the same speed while maintaining the concentricity of the molds to the spinning axis of the tube to produce quality spun cast articles.

20 Claims, 15 Drawing Figures

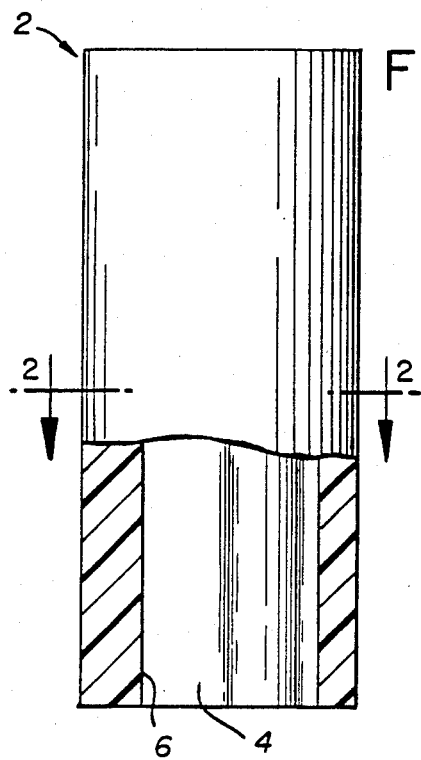
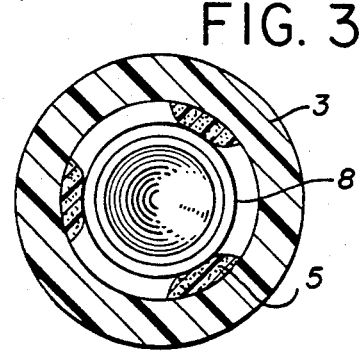
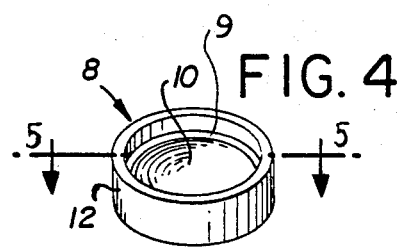
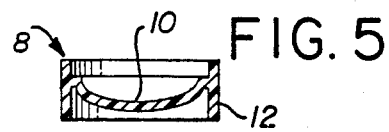
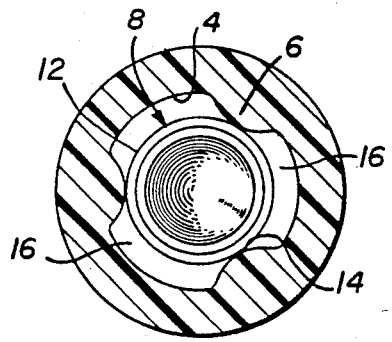
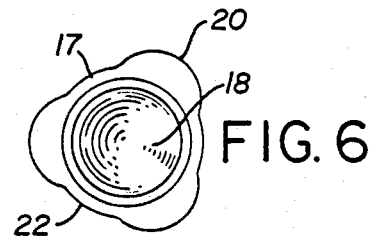
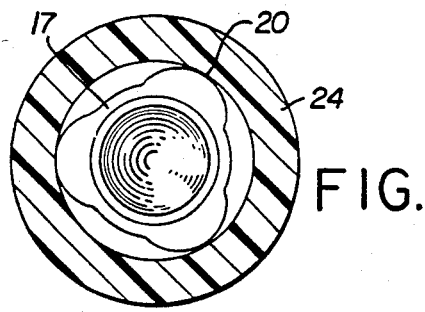

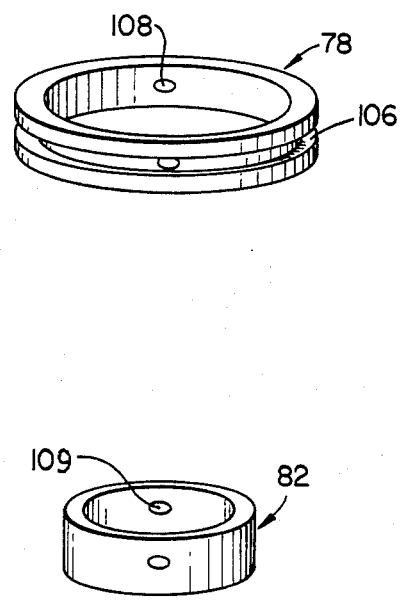
FIG. 14
FIG. 15
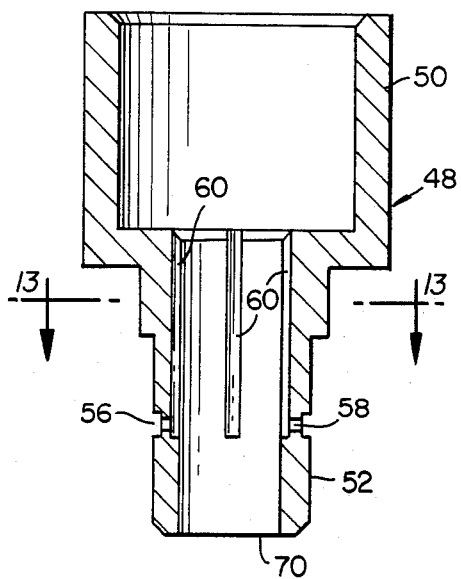
FIG. 12
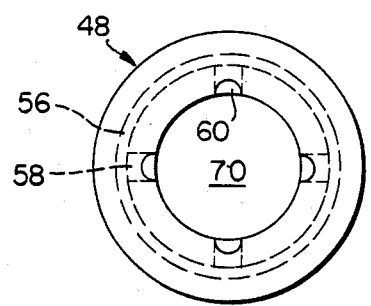
FIG. 13

DEVICE AND METHOD FOR CENTRIFUGALLY CASTING ARTICLES

DESCRIPTION

TECHNICAL FIELD

The present invention relates to a device and method for centrifugally casting of a plurality of axially symmetrical or asymmetrical objects such as lenses and disc valves. In various aspects, the present invention relates to a device and method employing a novel polymerization column and mold arrangement in which the column is adapted to accommodate a number of vertically arranged molds in interference fitting relationship in a manner such that the rotation of the polymerization column causes synchronized rotation of the molds at the same speed while maintaining the concentricity of the molds to the longitudinal axis of the column thereby effectively insuring the production of a plurality of symmetrical or asymmetrical spun cast identical articles which fall within exacting predetermined specification and requirements.

BACKGROUND ART

It is known that the polymerization casting of axially symmetrical articles, such as contact lenses, can be performed by using equipment in which individual molds are arranged in a carousel or in a vertical stack configuration. These individual molds, characterized by an outer cylindrical wall and a mold cavity with an exposed concave bottom surface and containing a liquid polymerizable mixture in the cavity, are caused to rotate about their vertical axis at a rotational speed (and under polymerization conditions) sufficient to create a centrifugal force which causes a radially outward displacement of the liquid reactants in the mold. By maintaining the rotating mold(s) under predetermined and known polymerization conditions, the outwardly displaced liquid reactants are caused to polymerize to a solid polymeric contact lens. The resulting lens is characterized by a convex optical surface which corresponds to the concave surface of the mold and a concave optical surface whose geometry has been created, to a significant degree, by the centrifugal force(s) employed during the polymerization cycle.

In the centrifugal casting of contact lenses on a commercial scale, it is preferred for the attainment of good yield to effect the polymerization or curable reaction under an inert gaseous medium such as argon or nitrogen. This is due to the fact that the oxygen component of air entrained within the polymerization column can inhibit the polymerization reaction and adversely affect the quality and acceptability of the contact lens product. A controlled feed of nitrogen through the polymerization column will purge any entrained air in the polymerization zone and provide an inert environment for conducting the polymerization process.

The aforesaid carousel arrangement is rather complex and quite large with respect to the size of the molds. It requires that each mold be individually rotated on its own separate vertical axis. It is reported that the carousel arrangement suffers from the disadvantages of requiring excess inert gas to eliminate the inhibiting effect of oxygen (in the air) present during the polymerization reaction. The use of excess inert gas during the polymerization of the monomeric reactants causes the entrainment of monomer in the form of vapors and the subsequent deposition and/or polymerization on the walls and equipment. Further information is set forth in U.S. Pat. No. 3,660,545, issued May 2, 1972, the full disclosure of which is incorporated by reference as if set out in full text.

In the vertical stack arrangement a rotatable polymerization tube having an internal circular cross-sectional geometry is adapted to receive at one end of the tube a plurality of circular molds which become seated to one another in the said tube, each mold containing the liquid polymerizable reactants in the mold cavity. In operation, the molds are gravity fed into the upper end of the polymerization tube and free-fall through the tube against an upwardly flowing inert gas, e.g., carbon dioxide, due to their own weight. The exit end of the tube is seated tightly on a revolving plate member which imparts the rotation to the tube and which plate has a centrally defined opening for discharging inert gas into the polymerization tube to contact the descending gravity fed molds. In this type of construction, the revolving plate member would have to be disconnected and displaced from the polymerization column to remove the molds. In addition, the feeding of the inert gas from the center of the revolving plate member into the polymerization column and onto the bottom surface of the bottom most mold could impede the rotation of this mold and thereby prevent the molds within the tube from being rotated at the same speed due to undesirable slippage between the molds and the inner wall of the polymerization column.

This gravity feed arrangement whereby molds are fed into the elongated polymerization zone of the rotating tube suffers from the disadvantage that some of the (sliding) molds may tilt or wobble within the polymerization column such that their horizontal axes form with the longitudinal axis of the tube an angle which is a deviation from the predetermined angle calculated for that particular polymerization run. In the production of small articles requiring high precision and geometry such as contact lenses, heart valves, and the like, the tilted or wobbling molds may result in the production of asymmetrical plastic articles lacking the predetermined optical geometry required in the contact lens article or the high exactness and detail expected in artificial heart valves. In addition, the rotation of the tube by the revolving plate member does not insure that all the molds within the tube will all be rotated at the same speed due to undesirable slippage between the molds and the inner wall of the tube. Consequently, this inability to maintain synchronization of the rotation of the molds with the rotation of the polymerization tube can result in the production of the articles, e.g., contact lenses, disc valves for surgical applications, etc., which fail to fall within exacting predetermined specifications and requirements.

A widely practiced technique for the manufacture of soft contact lenses involves the lathing procedure. This technique has many drawbacks inasmuch as it is a labor intensive operation, requires several steps, is relatively expensive, and the finished lens product is characterized by striations on its optical surfaces. In the lathing technique, an appropriate polymerization medium is first polymerized into a cylindrical shape from which there are cut so-called lens "buttons" or lens blanks, or the lens blanks per se can be made in appropriate molds. The blanks are subjected to a postcure treatment to improve certain of their physical characteristics. A predetermined curved surface is thereafter cut on one face of the blank by using precision lathe machinery and the cut curved surface is polished to an optical surface. Formation of an optical surface on the opposite face of the blank requires adhering the partially cut blank to an arbor or mandrel by means of a waxy substance in a manner that the uncut face of the blank is exposed for the lathing and polishing operations. Thereafter, there are washing and cleaning steps to remove residues from the cutting and polishing procedures and eventually, as with soft contact lenses, soaking in a physiologic solution until osmotic equilibrium is reached at which stage the hydrogel lens attains its final dimensions.

OBJECT OF THE INVENTION

Accordingly, one or more objects will be achieved by the practice of the invention.

Objects of the invention are for the provision of novel devices and novel methods for the centrifugal casting of reproducible articles of high precision and exactness of detail.

Another object of the invention is to provide a novel polymerization column having a longitudinal axis and which is adapted to accommodate within the interior of the column a plurality of non-free falling, tightly seated molds, the vertical axis of rotation of the molds being in predetermined concentric or parallel relationship to the longitudinal axis of rotation of the column.

Yet another object is to provide a novel device comprising a polymerization column and mold arrangement in which the column is adapted to and accommodates a number of vertically arranged molds in interference fitting relationship in a manner such that the rotation of the polymerization column causes synchronized rotation of the molds while maintaining the concentricity of the molds to the longitudinal axis of the column so as to produce a plurality of exacting symmetrical or assymetrical articles such as contact lenses, artificial heart valves, diaphragms and the like.

Still another object of the invention is to provide for the manufacture of small plastic articles of high precision and exacting predetermined specifications by practicing the novel processes and utilizing the novel apparatus disclosed herein.

Another object of the invention is to provide a process which is not labor intensive or capital intensive, which can be operated in an efficient manner on a continuous basis, which is relatively small in size as to be readily portable and/or which obviates various disadvantages of the art.

The foregoing as well as additional objects will become fully apparent from the following description and the accompanying drawings.

DISCLOSURE OF THE INVENTION

The invention relates to a device for the centrifugally casting of articles comprising a rotatable polymerization tube (column) adapted for rotation about a vertical (longitudinal) axis and adapted for receiving in vertical series a plurality of molds containing a polymerizable or curable composition; securing means for securing a plurality of molds in vertical series in an interference fitting and sliding relationship within said tube, said securing means being adapted to concentrically dispose said molds to the vertical axis of said polymerization tube; gas flow means associated with the inner surface of said tube and the outer wall of said molds to accommodate a flow of a gaseous medium through said polymerization tube; and said device being operable such that the rotation of said tube causes the synchronized rotation of said molds while maintaining the concentricity of said molds to the vertical axis of said polymerization tube until at least the polymerizable or curable composition in each mold is spin cast into a predetermined shaped article.

In one aspect the invention relates to a method for producing shaped articles which comprises the steps of:

(a) rotating a polymerization column about its longitudinal or vertical axis to provide an elongated zone, at least a portion of which comprises an elongated tubular polymerization zone, said polymerization column adapted to receive and accommodate a plurality of vertically arranged molds in interference fitting relationship;

(b) force feeding into one end of said polymerization column, a series of said molds, one at a time, each containing a fluid moldable composition such as a polymerizable or curable material in the cavity of the mold, such that each of said molds is secured in an interference fitting relationship within said polymerization column whereupon the rotation of said polymerization column about its longitudinal axis causes the synchronized rotation of said molds while maintaining concentricity of said molds with the longitudinal axis of said polymerization column;

(c) rotating said polymerization column about it longitudinal axis at a speed sufficient to cause radially outward displacement of said fluid moldable material in the cavity of the molds to assume a predetermined configuration;

(d) maintaining the elongated polymerization zone under polymerizable conditions to convert said fluid moldable material of predetermined configuration into the predetermined shaped solid article; and (e) withdrawing each of said molds from said polymerization column after at least the fluid moldable material is formed into the predetermined shaped solid article, said article preferably being in the shape of a contact lens.

Desirably, the device can have gas feeding means for directing an inert gaseous medium through the rotating polymerization column containing the rotating molds. It is preferred that in the spin casting of soft contact lenses, the gaseous medium be an inert gas of argon or nitrogen. This is due to the fact that undesirable air entrained within the tube during polymerization will inhibit the polymerization process and thereby result in a product of unacceptable quality. A feed of inert gas, such as nitrogen, through the polymerization tube will purge any entrained air and provide an inert environment for the polymerization process to occur. The novel gas feed means disclosed in copending application Ser. No. 490,626 now U.S. Pat. No. 4,468,184 filed on May 2, 1983 by the same assignee of the subject application can be used. The disclosure made in this application, to the extent intended herein, is incorporated by reference as if set out in full text.

The securing means which secure the molds within the polymerization tube can be at least two spaced apart longitudinal projections on the inner surface of the polymerization tube which would provide an interference fit for the molds. The radially inward longitudinal projections on the tube, such as ridges, could form an integral part of the tube and be made of the same material or it could be a separate component secured to the inner surface of the tube in a conventional manner using an adhesive or the like. The material constituting the projection should be sufficiently hard to withstand the frictional contact made with the outer wall of the molds without exhibiting excessive wear that could minimize or destroy the interference fit required between the molds and the contact surface of the polymerization tube. The inner diameter of the circle on which the contact points of the tube fall on the circumference (of said circle) could be equal to or preferably slightly smaller than the outer diameter of the mold so as to insure an interference fit but slidable relationship there between.

To compensate for excessive frictional wear, the projections could be made of a resilient material that would substantially recover its size and shape after being deformed by the molds fed into the polymerization tube. The resilient projections would generally provide contact points with the outer wall of the mold and would fall on the circumference of a circle (from a cross sectional view of that tube) whose inner diameter within the tube would be smaller than the inner diameter of a tube employing a hard material as the inward projections. The use of a resilient material would provide for the securement of the molds within the tube to insure that the concentricity of the molds with the spin axis of the tube is maintained while providing for the synchronized rotation of the molds with the rotation of the tube.

In another alternate embodiment, the outer wall of the molds rather than the inner surface of the cylindrical tube may contain a plurality of spaced apart projections (preferably at least three) to provide the interference fit required to insure that the horizontal plane of the molds are maintained substantially perpendicular to the vertical (longitudinal) axis of the tube. In a like manner, the protrusions can be either made as an integral part of the mold material or alternately can be a separate hard or resilient component that could be secured to the outer wall of the molds in a conventional manner using an adhesive or the like.

When employing the spaced apart protrusions on the inner surface of the tube or on the outer wall of the mold, care should be taken to insure that each protrusion covers a sufficient arc segment so as to prevent tilting of the molds when they are fed through the tube. In the preferred embodiment the inner vertical surface of the tube or the outer wall of the molds would have at least three equally spaced apart protrusions that will insure that the concentricity of the molds with the spin axis of the tube is maintained. In all embodiments of the device in which the plurality of molds are secured in vertical alignment within the tube, arc segments between adjacent protrusions will provide a passage to accommodate a gaseous medium, such as an inert gas, to be fed or directed into the tube during the rotation of the tube.

As used herein the language "maintaining the concentricity of the molds to the spin (longitudinal) axis of the (polymerization) tube" shall mean the rotation of the molds per se in a plane which is substantially perpendicular to the vertical (longitudinal) axis of the tube. Throughout the specification it is to be noted that the words "tube" and "column" have been used interchangeably. By way of illustrations, the hollow cross sectional area of the tube can represent a circle interrupted by a plurality of equally protruding vertical ridges or projections (FIG. 2) from the inner cylindrical wall of the tube to insure an interference fit with the outer wall of the circular molds (FIGS. 2 and 4); or it can represent an uninterrupted circle (FIG. 7) which can accommodate in interference fitting relationship molds whose outer wall has a plurality of equal protrusions which are preferably equally spaced apart (FIGS. 6 and 7). The hollow cross sectional shape of the tube can also represent a square and the plan view of the mold can represent a circle (FIG. 9) provided that the external diameter of the mold is equal to or slightly larger than the internal length of one side of the square thereby insuring an interference fitting relationship. In a further illustration, the hollow cross sectional shape of the tube can represent an equilaterial triangle and the plan view of the molds can represent a circle (FIG. 10) which in this instance the external diameter of the mold is equal to or slighly larger than the length of one side of the equilateral triangle multiplied by the fraction $2/\sqrt{3}$.

By the practice of the inventions contemplated herein, there can be produced precision articles of predetermined and exacting details and dimensions, e.g., small medical devices such as heart valves and diaphragms; contact lenses; and others. Such articles, depending on the ultimate use, can be hard, flexible, or soft and they may be hydrophillic or hydrophobic.

Any fluid polymerizable, curable or moldable reactant or mixture with/without an inert or reactive solvent which is/are capable of being displaced outwardly due to the rotation of the column, i.e., by the resultant centrifugal forces, can be employed in the practice of the invention. The medium comprising the reactant(s) constitutes a homogenous liquid and is capable of forming a desired shaped article during the centrifugal casting operation. The article may be opaque, translucent or transparent depending on the ultimate use of the cast article formed. For instance, it is not generally a necessity that diaphragms and artificial heart valve substitutes obtained by the practice of the invention be colorless and transparent. On the other hand, for example, it is a requirement that soft hydrophilic contact lenses be fully transparent, of good optical quality, soft and resilient as well as possessing other necessary and desirable characteristics.

In particular, the centrifugal casting device of this invention coupled to gas feeding means can be utilized in the manufacture of a wide variety of contact lenses which can be symmetrical or asymmetrical; hard, flexible or soft; water absorptive or non-water absorptive; low, medium, or high oxygen permeability or transportability; and the like. By choosing suitably designed mold cavities or bottoms there can be obtained a wide variety of modified lens shapes, e.g., toric, bifocal, truncated and/or ballasted contact lenses. A wide variety of materials or construction can be employed to fabricate the molds; see, for example, U.S. Pat. No. 3,660,545. For the preparation of hydrophilic articles such as soft contact lenses a mold fabricated of a thermoplastic material, such as polypropylene, is suitable. To insure proper wetting of the optical surface of the mold by the lens-forming mixture it is desirable to first pretreat or hydrophilize the said surface by known methods.

The liquid lens-forming mixture can comprise monomer, prepolymer or vulcanizable components. Particular suitable components are hydrophilic monomers preferably including those which form slightly or moderately crosslinked, three dimensional networks such as those disclosed in U.S. Pat. No. 3,822,089. Illustrative hydrophilic monomers include water soluble monoesters of an acrylic acid or methacrylic acid with an alcohol having an esterifiable hydroxyl group and at least one additional hydroxyl group such as the mono- and polyalkylene glycol monoesters of methacrylic acid and acrylic acid, e.g., ethylene glycol monomethacrylate, ethylene glycol monoacrylate, diethylene glycol monomethacrylate, diethylene glycol monoacrylate, propylene glycol monomethylate, dipropylene glycol monoacrylate, and the like; the N-alkyl and N,N-dialkyl substituted acrylamides and methacrylamides such as N-methylacrylamide, N,N-dimethylacrylamide, N-methylmethacrylamide, N,N-dimethylmethacrylamide, and the like; N-vinylpyrrolidone; the alkyl substituted N-vinyl pyrrolidones, e.g., methyl substituted N-vinylpyrrolidone; glycidyl methacrylate; glycidyl acrylate; the unsaturated amines; the alkyl ethyl acrylates; solubilized collagen; mixtures thereof; and others known to the art.

Hydrophilic monomers particularly useful in the practice of the invention to manufacture contact lenses include hydrophobic acrylic esters, suitably lower alkyl acrylic esters, preferably wherein the alkyl moiety contain 1–5 carbon atoms, such as methyl acrylate or methacrylate, ethyl acrylate or methacrylate, n-propyl acrylate or methacrylate, isopropyl acrylate or methacrylate, isobutyl acrylate or methacrylate, n-butyl acrylate or methacrylate, or mixtures thereof.

Other suitable monomers include the ethylenically unsaturated monocarboxylic acid esters, in particular, the methacrylic and acrylic acid esters of siloxane monomers and polymers with/without a pendant hydroxyl group. These monomers are well documented in the contact lens art; see, for example, U.S. Pat. Nos. 4,139,548; 4,235,985; 4,152,508; 3,808,178; 4,139,692; 4,248,989; and 4,139,513. The disclosure of the foregoing illustrative patents, to the extent intended herein, are incorporated by reference as if set out in full text.

Among the preferred monomeric mixtures are those which contain at least one alkylene glycol monoester of methacrylic acid, especially ethylene glycol monomethacrylate, and at least one crosslinking monomer such as the alkylene glycol diester of methacrylic acid, especially ethylene glycol dimethacrylate. Such mixtures may contain other polymerizable monomers, desirably in minor amounts such as N-vinylpyrrolidone, methyl methacrylate, acrylamide, glycidyl methacrylate, N-methylacrylamide, diethylene glycol monomethacrylate, and others illustrated above.

The above illustrated monomers, monomeric mixtures including mixtures of hydrophobic and hydrophilic reactants, may be further admixed with a minor proportion of di- or polyfunctional polymerizable species to cause crosslinking of the polymeric matrix as polymerization or curing proceeds. Examples of such di- or polyfunctional species include: divinylbenzene, ethylene glycol diacrylate or methacrylate, propylene glycol diacrylate or methacrylate, and the acrylate or methacrylate esters of the following polyols: triethanolamine, glycerol, pentaerythritol, butylene glycol, diethylene glycol, triethylene glycol, tetraethylene glycol, mannitol, sorbitol and the like. Other crosslinking monomers can be illustrated by N,N-methylene-bis-acrylamide or methacrylamide, sulfonated divinylbenzene, and divinylsulfone.

Additional lens-forming materials which are suitable in the fabrication of contact lenses are illustrated by one or more of the following U.S. Pat. Nos. 2,976,576; 3,220,960; 3,937,680; 3,948,871; 3,949,021; 3,983,083; 3,988,274; 4,018,853; 3,875,211; 3,503,942; 3,532,679; 3,621,079; 3,639,524; 3,700,761; 3,721,657; 3,758,448; 3,772,235; 3,786,034; 3,803,093; 3,816,571; 3,940,207; 3,431,046; 3,542,461; 4,055,378; 4,064,086; and 4,062,627.

The polymerization reaction can be carried out in bulk or with an inert solvent. Suitable solvents include water; organic solvents such as water-soluble lower aliphatic monohydric alcohols as well as polyhydric alcohols, e.g., glycol, glycerol, dioxane, etc.; and mixtures thereof. In general, the solvent comprises a minor amount of the reaction medium, i.e., less than about 50 weight percent.

Polymerization of the lens-forming mixture may be carried out with free radical catalysts and/or initiators of the type in common use in vinyl polymerization. Such catalyst species can include the organic peroxides, the alkyl percarbonates, hydrogen peroxides, and inorganic materials such as ammonium, sodium, or potassium persulfate. Polymerization temperatures can vary from about 20° C., and lower, to about 100° C., and higher.

Polymerization of the monomer or prepolymer material can also be effected using, for example, radiation (U.V., X-ray, microwave, or other well-known forms of radiation) with/without the presence of well-known initiator(s) and/or catalyst(s).

When using radiation as the catalyst in the polymerization process, the polymerization column (tube) is fabricated from a material that will not impede the transmission of the radiation into the polymerization zone of the column. Glass, such as Pyrex, would be a suitable material for the polymerization column when using radiation as the catalyst. When using other types of catalysts as recited above, the polymerization column could be fabricated from various type of metals such as steel, bronze and the like.

The shape of a lens blank may be controlled not only by the size and shape of the mold, but also by the amount and nature of the components comprising the lens-forming mixture, by the synchronized rotational speed of the column and mold during polymerization, by the position of the axis of rotation of the column and mold relative to the direction of gravity, by axis of rotation of the column relative to the optical axis of the (formed) lens in the mold cavity, and the like. Tilting the axis of rotation or when the axis of rotation does not pass through the optical center of the (forming) lens, a prism component can be added to the lens.

In the fabrication of contact lenses, the lens-forming material is placed in the mold cavity having an optical concave surface wetted by said material, and then fed one at a time into the inlet end of polymerization column which desirably comprises a "conditioning" zone near the inlet end and a polymerization reaction zone toward the outlet end. It is preferred that the molds be characterized by a pretreated optical surface to increase its hydrophilicity or wettability in a manner well-known in the art. The speed of rotation of the column and the molds is then adjusted to cause and/or maintain radially outward displacement of the lens-forming mixture to a predetermined lens configuration which when subjected to the polymerization conditions employed in the column will form the desired shaped contact lens. Rotational speed of, for example, 300 r.p.m., and lower to 600 r.p.m., and higher, can be conveniently used. The precise rotational speed to employ in the operation is, of course, well within the skill of the artisan. Factors to be considered include the type and concentration of the components comprising the lens-forming material employed, the operative conditions of choice, the type and concentration of catalyst, initiator, and/or radiation energy source, and factors discussed previously and readily apparent to the artisan.

BRIEF DESCRIPTION OF DRAWING

The present invention will become more apparent from the following description thereof when considered together with the accompanying drawing which is set forth as being exemplary of embodiments of the present invention and is not intended in any way to be limited thereof and wherein:

FIG. 1 is a side elevational view partly in cross-section of a polymerization tube of this invention.

FIG. 2 is a cross sectional view taken along line 2—2 of FIG. 1.

FIG. 3 is a cross sectional view of another embodiment of the tube of this invention.

FIG. 4 is a perspective view of a mold for use in the polymerization tube of this invention.

FIG. 5 is a cross sectional view taken along line 5—5 of FIG. 4.

FIG. 6 is a plan view of a mold for use in one embodiment of this invention.

FIG. 7 is a cross sectional view of a polymerization tube showing the mold of FIG. 6 disposed within said polymerization tube.

FIG. 12 is a side elevational view in cross-section of the rotatable sleeve member shown in FIG. 11.

FIG. 13 is a view taken along the lines 13—13 of FIG. 12.

FIG. 14 is a perspective view of the outer support ring member for the bearing pair shown in the gas feed means of FIG. 11.

FIG. 15 is a perspective view of the inner support ring member for the bearing pair shown in the gas feed means of FIG. 11.

DETAILED DESCRIPTION OF DRAWING

Figure 8:
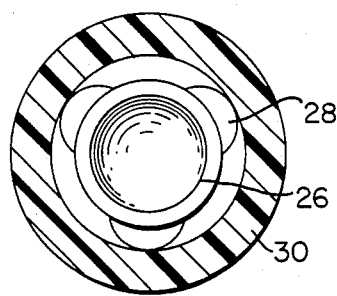
FIG. 8 is a cross sectional view of a polymerization tube showing another embodiment of a mold of this invention disposed within a polymerization tube.

Referring in detail to FIGS. 1 and 2, there is shown a tube 2, such as a polymerization tube, made of an inert material such as glass, metal, plastic, metal alloys and the like. Disposed on the internal wall 4 of tube 2 are three equally spaced longitudinal projections or ridges 6. The projections 6 are shown as made of the same material as tube 2. FIGS. 4 and 5 show a mold 8 having a mold cavity 10 within a cylindrical wall 12. Mold 8 has a circular horizontal mold shoulder 9 located between inner mold wall 7 and mold cavity 10. The mold cavity 10 can assume any desired shape required of the finished article. As stated above, this shape could be axially symmetrical or asymmetrical. Referring specifically to FIG. 2, mold 8 is shown disposed within polymerization tube 2 whereupon there is an interference fit between the wall 12 of mold 8 and the outer surfaces 14 of projections 6 which form contact points for mold 8. Basically, the outer diameter of mold 8 would be equal to or slightly larger than the diameter of an inscribed circle on whose circumference are contact points 14 of projections 6. The configuration and arrangement of contact points 14 and wall 12 insures an interference fit between the mold 8 and the tube 2 thereby securing and maintaining the concentricity of the mold 8 to the longitudinal axis of tube 2 while the tube and molds rotate at the same speed. Moreover, the positioning of the molds with respect to the vertical axis of the polymerization tube is maintained during its forced descent down the polymerization tube.

A plurality of molds 8, each containing a polymerizable or curable composition can be fed into polymerization tube 2 which upon spinning will cause the composition, under the centrifugal force, to conform to the shape of the cavity 10 in mold 8. The channels 16 formed or defined between adjacent projections 6, inner wall 4 of tube 2 and outer wall 12 of mold 8 will permit a gaseous medium such as an inert gas to be directed through the rotating tube in a conventional manner using conventional means. Although not shown, a conditioning tube could be coaxially mounted on top of polymerization tube 2 and preferably rotated at the same speed of rotation as the polymerization tube 2. Alternatively, and most preferably, the conditioning tube and polymerization tube could constitute the same tube so that a portion of the tube is used for conditioning the composition and the other portion could be used for the polymerization reaction. An advantage of the conditioning tube is that during rotation it causes and/or maintains the desired liquid shape of the article prior to being polymerized to a solid shape in the polymerization tube.

FIG. 3 shows another embodiment of a polymerization tube 3 having three longitudinal projections 5 which are made of a different material than the material of tube 3. Preferably projections 5 are fabricated of a resilient material which would be compressed by mold 8 when forced into polymerization tube 3 thereby providing an interference fit there between. When using a resilient material, the inner diameter within tube 3 of an inscribed circle whose circumstances contains the contact points of projections 5 can be smaller than the inner diameter formed of projections made of a hard material because the resilient material has the characteristic of substantially recovering its shape and size after being deformed.

FIG. 6 shows another type of mold 17 which can be used in the invention. Mold 17 has a cavity 18 and three external projections 20 equally spaced around its outer wall 22. Mold 17 can be used in conjunction with a typical conventional cylindrical tube 24 as shown in FIG. 7 and can provide the same degree of interference fit between the mold 17 and tube 24 so as to maintain the concentricity of the mold to the axis of the tube. Projections 20 is preferably fabricated as an integral part of the mold material or alternatively can be a separate material 28 for mold 26 as shown in FIG. 8. Referring to FIG. 8, mold 26 is disposed within cylindrical tube 30 in an interference fit arrangement.

Figure 9:
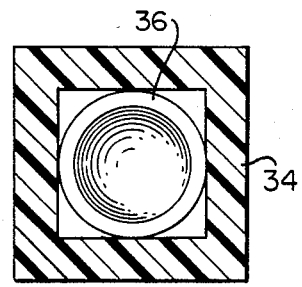
FIG. 9 is a cross sectional view of another embodiment of a polymerization tube showing a mold disposed and secured within a polymerization tube whose internal area represents a square.

FIG. 9 discloses a further embodiment and shows mold 36 (same as mold 8 in FIG. 4) disposed within polymerization tube 34 which has a hollow cross sectional area defining a square. Tube 34 can be conveniently fabricated by appropriately bonding four rectangular pyrex panels or other suitable material with a suitable adhesive, e.g., epoxy glue. To provide the interference fit, the external diameter of mold 8 is equal to or is very slightly larger than the internal length of one side of the square.

Figure 10:
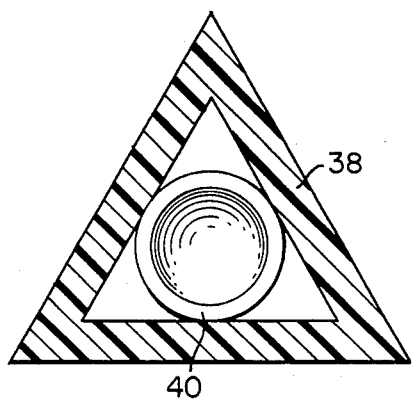
FIG. 10 is a cross sectional view of another embodiment of a polymerization tube showing a mold disposed and secured within a polymerization tube whose internal area represents an equilateral triangle.

FIG. 10 discloses a further embodiment and shows mold 40 (same as 8 in FIG. 4) disposed within polymerization tube 38 whose hollow cross sectional area depicts an equilateral triangel. The interference fit relationship is achieved by using molds whose external diameter is equal to or very slightly larger than the internal length of one side of the equilateral triangle multiplied by the factor $2/\sqrt{3}$.

Figure 11:
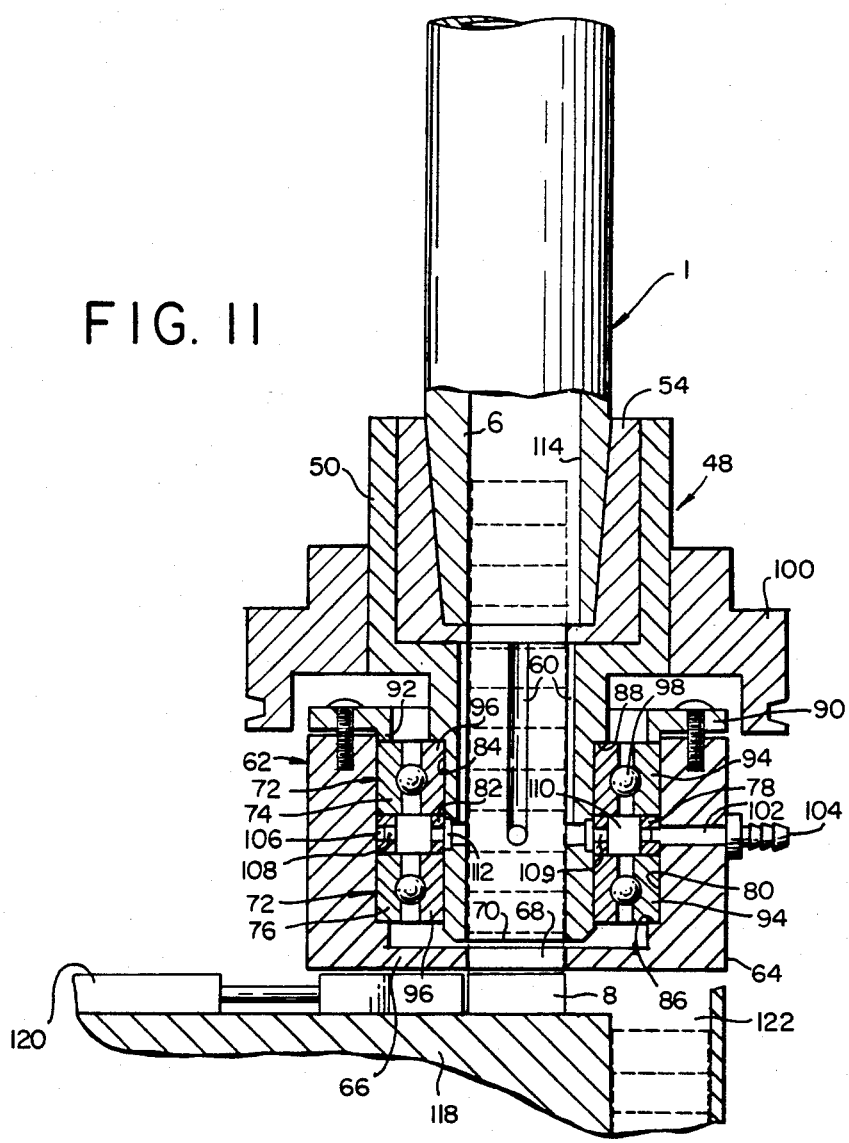
FIG. 11 is a side elevational view partly in cross-section of a gas feed means suitable for use in this invention.

Referring in detail to FIGS. 11 to 13 there is shown a gas feed means suitable for use in conjunction with the novel device and method of this invention, said gas feed means being described in copending application Ser. No. 490,626 filed on May 2, 1983 now U.S. Pat. No. 4,468,184 and discussed above. Specifically, the gas feed means includes a rotatable sleeve member 48 having an upper tubular section 50 and a lower tubular section 52. As will be seen, the upper tubular section 50 has a larger cross-sectional area than polymerization column 1 and the lower tubular section 52. Disposed within the upper tubular section 50 is a resilient liner material 54, preferably plastic, that is slightly tapered and adapted for receiving the lower end of polymerization column 1 in frictional securement therein. As shown, the lower end of polymerization column 1 is slightly tapered to permit easy insertion and securement of polymerization tube 1 within liner 54. Although liner 54 is preferably made of plastic, it can be made of any resilient material that would be suitable for securing the lower end of the polymerization column 1 in frictional securement within said liner 54 so that rotation of sleeve member 48 will impart synchronized rotation to polymerization column 1. As shown in FIG. 11, the inner diameter of polymerization column 1 is substantially equal to the inner diameter of lower tubular section 52 of sleeve 48 and axially aligned therewith so that molds 8 (shown in outline form in FIG. 11 and shown in a plan view in FIG. 4) exiting from polymerization column 1 will be fed into and descend through lower tubular section 52 of sleeve 48.

As shown in FIG. 11, 12 or 13, a circumferential groove 56 is formed in the outer wall surface of lower tubular section 52 and a plurality of gas inlet openings 58 are circumferentially disposed through and defined by the base of groove 56. A plurality of longitudinal grooves 60 are formed in the inner wall of lower tubular section 52 with each groove 60 extending from a communicating gas inlet opening 58 up through the top of lower tubular section 52. Thus any gas entering inlet opening 58 when molds 8 are disposed within lower tubular section 52 will be directed up through grooves 60 and into the interior of polymerization column 1.

Referring to FIG. 1, lower tubular section 52 of sleeve 48 is disposed within a cylindrical cupped support member 62 having an upstanding cylindrical wall 64 and a base 66 defining an opening 68 which is axially aligned with the opening 70 of lower tubular section 52. Disposed between the upstanding cylindrical wall 64 and lower tubular section 52 is a cylindrical preloaded bearing pair 72 including an upper bearing 74 and a lower bearing 76. Separatng the bearing pair 72 and supporting upper bearing 74 is an outer support ring 78 disposed adjacent the internal wall 80 of support member 62, and an inner support ring 82 disposed adjacent the outer wall 84 of lower tubular section 52. In assembling the unit, the lower bearing 76 is placed into the cylindrical cupped support member 62 such that its lower surface rests on flange 86. Outer support ring 78 and inner support ring 82 are then disposed on top of lower bearing 76 whereupon upper bearing 74 can then be mounted on top of outer support ring 78 and inner support ring 82. When rotatable sleeve member 48 is inserted within support 62, circular flange 88 disposed on the outer wall of lower tubular section 52 secures the upper bearing 74 in place. A securing ring 90 having an L-shaped cross section is detachably secured to the top of support member 62 by any suitable means such as the threaded elements shown, with its internal flange member 92 securing the upper bearing 74 in proper alignment within support member 62. Each of the bearings 74 and 76 includes an outer fixed race 94 and an inner rotatable race 96 which are spaced apart by conventional ball bearings 98. By this arrangement, sleeve member 48 can be rotated within support member 62 by conventional belt means illustrated generally as 100 and which is operatively associated with a conventional motor driven belt means not shown.

Support member 62 is provided with an opening 102 defined in its side wall into which is secured a hose bar 104 which is adapted to be connected to a gaseous supply means not shown. In FIG. 14 outer support ring 78 is provided with an annual groove 106 disposed in its outer wall. A plurality of openings 108 are circumferentially disposed in the base of groove 106 and extends through its upstanding wall. As shown in FIG. 15, inner support ring 82 defines a plurality of openings 109 extending through its upstanding wall. Referring again to FIG. 11, it will be seen that the spaced apart pre-loaded bearing pair 72 and the spaced apart outer support ring 78 and inner support ring 82 define an annular zone 110.

In the operational mode and with reference to FIGS. 11 to 15, a gaseous medium fed through opening 102 travels along and within circumferential groove 106 and is directed through openings 108 and into annular zone 110. The gaseous medium is then directed through openings 109 in inner support ring 82, into and through openings 58 of lower tubular section 52 and up grooves 60 into the interior of polymerization column 1. The height of inner support ring 82 is greater than the width of circumferential groove 56 in tubular section 52 so that when inner support ring 82 is positioned adjacent groove 56, a circumferential zone 112 is defined that can accommodate a gaseous medium fed through openings 109 of inner support ring 82. This will allow a uniform gas flow to be fed through gas inlet openings 58 and up through grooves 60 into the polymerization column 1.

In the operational mode, mold 8 containing a polymerizable or curable compound in its cavity 10 is forceably ejected from the polymerization column 1 into tubular section 52 and with the diameter of the molds substantially equal to the cross-sectional diameter of tubular section 52, the molds 8 will effectively prevent any gaseous medium fed through openings 58 from escaping out opening 70 of tubular section 52. Thus the gaseous inert medium will flow up through grooves 60 into the interior of polymerization column 1 between the peripheral wall of molds 8 and the inner surface of polymerization column 1. The inner wall 114 of polymerization column 1 has a longitudinal projection 6 (see FIGS. 1 and 2) to provide an interference and sliding fit for molds 8. The inert gas fed up through polymerization column 1 will purge any entrained, undesirable gas such as oxygen in polymerization column 1 which could effect the quality and acceptability of the articles being casted. As shown in FIG. 11, an ejected mold 8 exited through opening 70 of the gas feed means will be supported on member 118 whereupon a conventional pusher means 120 will advance the ejected mold 8 to a receptacle 122.

The preload bearing pair 72, desirably incorporates seals of a conventional type which would provide a retention of lubricants for the bearings. These seals would serve to define the circumferential zone 110 and effectively prevent the escape of any gas to areas other than through the plurality of openings 58 in tubular section 52 of sleeve 48.

The common requirement in all the embodiments of the invention is that an interference fit be maintained between the molds and the tube to insure concentricity of the molds to the spin axis of the tube while maintaining synchronization of the rotation of the molds to the same speed as the rotation of the tube. In addition, the molds are slidable with respect to the tube so that the molds are vertically moved downward through the polymerization tube under a positive force.

EXAMPLE 1

The polymerization column depicted in FIGS. 1 and 2 along with gas feed means can be used to prepare lenses. Specifically, polypropylene molds (FIG. 2) having a concave spherical optical surface in the mold cavity can be used in the centrifugal casting of contact lens. The mold dimensions can be: outside diameter - 17 mm; inner diameter above mold cavity - 15.6 mm; height of mold - 7.5 mm; diameter of mold cavity - 13.2 mm; central mold cavity radius - 7.7 mm; depth of mold cavity (max) - 3.3 mm; width of circular horizontal mold shoulder (located between the inner mold wall and mold cavity) - 1.2 mm. The hydrophilicity or wettability of the optical surface of the molds can be enhanced by treatment in an oxygen, low temperature, plasma chamber for approximately 18 seconds, 50 watts gauge setting (Model LTA-302, Low Temperature Asher, LFE Corporation, Waltham, Massachusetts). To a series of these molds, there can be charged, individually, a metered amount of the lens-forming mixture, i.e., approximately 20 milligrams. The lens-forming mixture (based on total weight) could comprise the following recipe:

Components (Parts by Wt.)

2-Hydroxyethyl Methacrylate: 84.6
Ethylene Glycol Dimethacrylate: 1.0
Benzoin Methyl Ether (initiator): 0.2
Glycerol: 14.2

The molds can be transported laterally, on a conveyor belt or by positive force means, to the inlet end of a rotating Pyrex column which is supported in an upright position by support means. Said Pyrex column being generally as shown in FIG. 1 as polymerization column 2. The molds can be force fed downwardly, one at a time, into the vertical column by pusher or plunger means having a circular nose which engages the mold at the mold shoulder 9. When the rotating column is filled with molds (capacity can vary, for instance, from 60 to 120 molds), the force feeding of each mold at the inlet end and the removal or ejection of the bottom most mold (containing the shaped lens product) at the outlet end can be synchronized or automated to effect a continuous process. The speed of rotation of the column about its vertical axis can be about 400 r.p.m. and total residence time of each mold in the column can be about 20 minutes. The rotating column can be maintained at ambient room temperature, i.e., about 20°-22° C. with nitrogen continually flowing upward in grooves 60 (see FIGS. 3 to 5 into the polymerization column 2 to remove any entrained oxygen in the column. In the so-called "conditioning" zone in the upper portion of the column, centrifugal forces created by the column rotation will cause the radially outward displacement of the liquid lens-forming mixture in the spherical mold cavity to be formed onto a predetermined lens shape. The "conditioning" of said liquid material should be maintained for a period of about 15 minutes in its downward decent in the conditioning zone to the polymerization zone. The polymerization zone of the column should likewise be maintained at ambient room temperature. The polymerization reaction can be conducted using UV radiation from a source outside the column (UV source: medium pressure, mercury arc, UV emission - 300–400 nm, infrared is filtered, and lamp distance is 3 inches). The residence time in the polymerization zone should be about 5 minutes. A longer residence period can be employed, if desired, as well as subjecting the shaped contact lens blank still in the cavity of the mold to postcure conditions. Immersion in distilled water causes the hydrophilic lens blank to swell which (swelling) causes the separation of the contact lens from the mold. Repeated washings in distilled water insures removal of catalyst or initiator residue and unreacted monomer(s). The contact lens should be finally immersed in physiologic solution (0.9% saline) until it reaches osmotic equilibrium with the solution.

The finished lens will generally have a refractive power (wet) of −6 diopters. It will be optically clear, transparent, inert to bacteria, biocompatible with the cornea, water content of about 39% by weight, dimensionally stable, and exhibits good mechanical properties. It is useful as a daily wear "soft" contact lens.

EXAMPLE 2

The procedure of Example 1 can be repeated using the following recipe:

Components (Parts by Weight)

2-Hydroxyethyl Methacrylate: 78
Methacrylic Acid: 2
Isopropylpercarbonate: 0.4
Glycerol: 19
Ethylene Glycol Dimethacrylate (No UV source): 1.0
Polymerization Zone Conditions:
70° C.; residence time: 6 minutes.

This will produce a contact lens that is optically clear, transparent, inert to bacterial, biocompatible with living tissue, highly water-swellable, water-insoluble, dimensionally stable, and of good mechanical strength.

EXAMPLE 3

The procedure of Example 1 can be repeated using the following recipe:

Components (Parts by Weight)

2-Hydroxyethyl Methacrylate: 95
Methyl Methacrylate: 5
Vazo ® 33: 0.2
Propylene Glycol: 10
Ethylene Glycol Dimethacrylate: 0.5

® Registered Trademark of du Pont.
Polymerization Zone Conditions:
70° C.; residence time: 6 minutes.

This will produce a contact lens that is optically clear, transparent, inert to bacteria, biocompatible with living tissue, water-swellable, water-insoluble, dimensionally stable, and of good mechanical strength.

Modification of the mold cavity and of the recipe results in a wide variety of useful and suitable contact lenses as taught in U.S. Pat. No. 3,660,545, the full disclosure of which is incorporated by reference as if set out in full text.

We claim:

1. A device for centrifugally casting of contact lenses comprising a rotatable polymerization tube adapted for rotation about a vertical axis and adapted for receiving in vertical series a plurality of molds containing a polymerizable or curable composition; securing means for securing a plurality of molds in vertical series in an interference fitting relationship within said polymerization tube, said securing means being adapted to concentrically dispose said molds to the vertical axis of said polymerization tube; gas flow means associated with the inner surface of said polymerization tube and the outer wall of said molds to accommodate a flow of a gaseous medium through said polymerization tube; and said device operable such that the rotation of said polymerization tube causes the synchronized rotation of said molds while maintaining the concentricity of said mold to the axis of said polymerization tube until at least said polymerizable or curable composition in each mold is spin cast into a predetermined shaped contact lenses.

2. The device of claim 1 wherein said securing means are disposed on the inner longitudinal surface of said polymerization tube or the outer wall of said molds.

3. The device of claim 1 wherein said securing means are at least two projections extending from the inner surface of said polymerization tube which form an inner diameter of said polymerization tube that is equal to or slightly smaller than the outer diameter of said molds thereby providing a sliding and interference fit there between.

4. The device of claim 3 wherein said securing means comprises at least three equally spaced-apart projections extending from said inner surface of said polymerization tube.

5. The device of claim 4 wherein said projections are made of the same material as said tube and form an integral part of said polymerization tube.

6. The device of claim 4 wherein said projections are made of a different material than said polymerization tube.

7. The device of claim 6 wherein said projections are made of a resilient material.

8. The device of claim 1 wherein said securing means are at least two projections extending from the outer wall of said mold which form an outer diameter of said mold equal to or slightly larger than the inner diameter of said polymerization tube thereby providing a sliding and interference fit therebetween.

9. The device of claim 8 wherein said securing means comprises at least three equally spaced-apart projections extending from said outer wall of said mold.

10. The device of claim 9 wherein said projections are made of the same material as said mold and form an integral part of said mold.

11. The device of claim 9 wherein said projections are made of a different material than said mold.

12. The device of claim 11 wherein said projections are made of a resilient material.

13. A method for the centrifugal casting of shaped plastic contact lenses which comprises the steps of:
 (a) rotating a polymerization column about its longitudinal axis to provide an elongated zone at least a portion of which comprises an elongated tubular polymerization zone, said polymerization column adapted to receive and accommodate a plurality of vertically arranged molds in interference fitting relationship;
 (b) force feeding into one end of said polymerization column a series of said molds, one at a time, each containing a lens forming material of a fluid polymerizable or curable material in the cavity of the mold, such that each of said molds is secured in an interference fitting relationship within said polymerization column whereupon the rotation of said polymerization column about its longitudinal axis causes the synchronized rotation of said molds while maintaining concentricity of said molds with the longitudinal axis of said polymerization column;
 (c) rotating said polymerization column about its longitudinal axis at a speed sufficient to cause radially outward displacement of said polymerizable or curable material in the cavity of the molds within the elongated zone to assume a predetermined configuration;
 (d) maintaining the elongated polymerization zone under polymerizable conditions to convert said polymerizable or curable material of predetermined configuration into the predetermined shaped solid contact lenses; and
 (e) withdrawing each of said molds from said polymerization column after at least the polymerizable or curable material therein is formed into the predetermined shaped solid contact lenses.

14. The method of claim 13 wherein in step (c) an inert gaseous medium is fed through the elongated polymerization zone.

15. The method of claim 14 wherein the rotation of each mold is effected in a plane which is substantially perpendicular to the longitudinal axis of the polymerization column.

16. The method of claim 13 wherein said lens-forming material comprises a monoester of an acrylic or methacrylic acid and an alcohol having an esterifiable hydroxyl group and at least one additional hydroxyl group.

17. The method of claim 13 wherein said lens-forming material comprises 2-hydroxyethyl methacrylate.

18. The method of claim 13 wherein said lens-forming material comprises glycidyl methacrylate.

19. The method of claim 13 wherein said lens-forming material comprises an acrylamide.

20. The method of claim 13 wherein said lens-forming material comprises an ethylenically unsaturated monocarboxylic acid ester of a siloxane compound.

* * * * *